US012751383B2

(12) United States Patent
Norden et al.

(10) Patent No.: US 12,751,383 B2
(45) Date of Patent: Oct. 6, 2026

(54) SUBSTRATE COMPRESSION PROCESS AND PRODUCT

(71) Applicant: PROFILE PRODUCTS L.L.C., Buffalo Grove, IL (US)

(72) Inventors: Daniel Scott Norden, Anderson, SC (US); Ryan Michael Knauer, Hickory, NC (US); Gary Lane Bowers, Jonesborough, TN (US); Kevin Scott Spittle, Vero Beach, FL (US)

(73) Assignee: Profile Products L.L.C., Buffalo Grove, IL (US)

( * ) Notice: Subject to any disclaimer, the term of this patent is extended or adjusted under 35 U.S.C. 154(b) by 546 days.

(21) Appl. No.: 17/498,397

(22) Filed: Oct. 11, 2021

(65) Prior Publication Data

US 2022/0022390 A1 Jan. 27, 2022

Related U.S. Application Data

(63) Continuation-in-part of application No. PCT/US2021/031255, filed on May 7, 2021.

(60) Provisional application No. 63/021,533, filed on May 7, 2020.

(51) Int. Cl.
*A01G 24/44* (2018.01)
*A01G 24/23* (2018.01)
*A01G 24/50* (2018.01)

(52) U.S. Cl.
CPC ............ *A01G 24/44* (2018.02); *A01G 24/23* (2018.02)

(58) Field of Classification Search
CPC ................................ A01G 24/23; A01G 24/44
See application file for complete search history.

(56) References Cited

U.S. PATENT DOCUMENTS

2006/0107589 A1 5/2006 Rubin
2009/0113791 A1 5/2009 Bertin et al.
2014/0033608 A1 2/2014 Jancic et al.
2016/0143227 A1 5/2016 De Smet
2017/0114276 A1* 4/2017 Spittle .................... C05F 11/00
(Continued)

FOREIGN PATENT DOCUMENTS

CN 101036442 A 9/2007
EP 1210866 B1 4/2006
(Continued)

OTHER PUBLICATIONS

Blieninger, Franz, EP1210866A2—Translation, EPO, 2001, p. 1-24 (Year: 2001).*
(Continued)

*Primary Examiner* — Maria V Ewald
*Assistant Examiner* — Ethan Weydemeyer
(74) *Attorney, Agent, or Firm* — BROOKS KUSHMAN P.C.

(57) ABSTRACT

A compressed horticultural slab includes a substrate including a plurality of fibers compressed in a volume ratio of initial to compressed fiber of 1:4 to 1:60, the plurality of fibers having a shape of the slab, a first set of dimensions when the substrate has a moisture content of up to about 20 to 25 wt. % and a second set of dimensions when the moisture content increases above about 20 to 25 wt. %, based on the total weight of the substrate, the second set of dimensions having greater values than the first set of dimensions.

23 Claims, 6 Drawing Sheets

(56) References Cited

U.S. PATENT DOCUMENTS

| | | | |
|---|---|---|---|
| 2017/0137972 A1 | 5/2017 | Spittle et al. |
| 2018/0371708 A1 | 12/2018 | Spittle et al. |
| 2020/0299208 A1 | 9/2020 | Norden et al. |
| 2025/0151679 A1 | 5/2025 | Norden et al. |

FOREIGN PATENT DOCUMENTS

| | | | |
|---|---|---|---|
| EP | 4145985 | A1 | 3/2023 |
| JP | H02276513 | A | 11/1990 |
| JP | 3015530 | U | 9/1995 |
| JP | 2008296395 | A | 12/2008 |
| KR | 20100085878 | A | 7/2010 |
| WO | 2019/074875 | A1 | 4/2019 |
| WO | 2021226435 | A1 | 11/2021 |

OTHER PUBLICATIONS

PCT International Search Report, Dated Oct. 1, 2021, Application No. PCT/US2021/031255, Applicant Profile Products L.L.C., 4 Pages.

PCT International Preliminary Report on Patentability, Dated Nov. 8, 2022, Application No. PCT/US2021/031255, Applicant Profile Products L.L.C., 9 Pages.

Supplemental European Search Report, dated Apr. 18, 2024, for related EP Application No. EP21799715.

Notice of Refusal dated Feb. 19, 2025, received in related JP Appln. No. 2022-567830. (English Translation).

The Notice of Preliminary Rejection dated Feb. 27, 2026, which issued in related KR Application No. 10-2022-7042469. English Translation included.

Notice of Reasons for Refusal, dated Nov. 18, 2025 issued in related Japanese Patent Application No. 2022567830.

1st Chinese Office Action dated Dec. 13, 2025 which issued in related Chinese Application Serial No. 202180033677.3 (English Translation).

1st Australian Office Action dated Jan. 19, 2026 which issued in related Australian Application Serial No. 2021266771.

NPL_1st Office Action dated May 11, 2026, which issued in related MX Application No. MX/a/2022/013877. English Translation included.

2nd Chinese Office Action dated Jun. 22, 2026 received in related Chinese Application No. 202180033677.3. English Translation included.

Decision of Refusal dated Aug. 18, 2026 received in related Japanese Application No. JP2022-567830. English Translation included.

* cited by examiner

SUBSTRATE COMPRESSION PROCESS AND PRODUCT

CROSS-REFERENCE TO RELATED APPLICATIONS

This application is a continuation-in-part of PCT/US2021/031255 filed on May 7, 2021, which claims the benefit of U.S. patent application Ser. No. 63/021,533 filed on May 7, 2020, the disclosures of which are incorporated in their entireties by reference herein.

TECHNICAL FIELD

The present disclosure is related to a compressed fiber substrate product that may be used as a growing medium and/or for various hydroponic applications and a method of producing the same.

BACKGROUND

As erosion spreads around the world and food demand grows, working with well-balanced soil-less media has gained popularity. Typically, a growing medium placed in a grow bag is transported to a customer who uses the grow bag to encourage seedling and plant growth from the grow bag. But for economical and environmental reasons, there is a growing demand for low or zero carbon footprint products, which should also use more sustainable resources, thus avoiding non-renewable resources such as peat, while providing excellent fruit-bearing results. To achieve this demanding balance, there is a need for a product maximizing transportation capabilities while featuring ideal conditions for plant growth.

SUMMARY OF THE INVENTION

In at least one embodiment, a process for compressing a fiber product is disclosed. The process enables compression of the fiber product such that the product is flexible, yet retains its dimensions and relatively bulge-free surface upon re-expansion. The compressed product allows for lower transportation costs and better growing conditions, discussed below, than traditional grow bag media. The compression process may be tailored to provide ideal ratios of macropores to micropores for optimal water and air holding capacity. Also, the compressed product is structurally sound and may be usable as substrates for non-hydroponic applications, such as a fiberboard. At the same time, the compressed product may be organic, compostable, or disposable in an alternative eco-friendly manner.

In a non-limiting example embodiment, a compressed horticultural slab is disclosed. The slab includes a substrate having a plurality of fibers compressed in a volume ratio of initial to compressed fiber of 1:4 to 1:60. The plurality of fibers may have a shape of the slab, a first set of dimensions when the substrate has a moisture content of up to about 20 to 25 wt. % and a second set of dimensions when the moisture content increases above about 20 to 25 wt. %, based on the total weight of the substrate. The second set of dimensions has greater values than the first set of dimensions. The substrate may include wood fiber. The substrate or slab may further include fertilizer(s), macronutrient(s), micronutrient(s), mineral(s), binder(s), natural gum(s), surfactant(s), compost, paper, sawdust, or a combination thereof. The slab may be sterile. The slab may have higher volume of capillary pores than non-capillary pores. The slab's surface may be substantially free of bulging when the slab has the first set of dimensions or the second set of dimensions. The slab may be flexible and breakage-resistant. The second set of dimensions may be about 1.25 to 5% greater than the first set of dimensions.

In another embodiment, the plurality of fibers may have a shape of the slab, a starting set of dimensions, prior to compression, where the substrate has a moisture content of about 15 to 25 wt. %, an intermediate set of dimensions, after compression, where the moisture content decreases to about 5 to 15 wt. %, and an expanded set of dimensions, after wetting, of about 50 to 100% based on the total weight of the substrate. The starting and expanded sets have at least one dimension, and in other embodiment, more than one, and in yet other embodiments, more than two, that has a greater value than the corresponding dimension in the compressed set of dimensions. The expanded set of dimensions have at least one dimension, and in other embodiment, more than one, and in yet other embodiments, more than two, that has a greater value than the corresponding dimension in the starting set of dimensions.

In another exemplary embodiment, a compressed horticultural slab is disclosed. The slab includes a fibrous substrate comprising a plurality of compressed fibers, the substrate having a moisture content of up to about 20 to 25 wt. % and having a final loose bulk density defined by the formula (I):

$$\rho x = \rho 1 * x, \tag{I}$$

where:

- ρx is the final loose bulk density,
- ρ1 is the initial loose bulk density, and
- x is the compression factor including any number between 4 and 60.

The compressed slab may have a substantially rectangular shape and uniform dimensions throughout its length and a higher volume of capillary pores than non-capillary pores. The ρ1 may equal 1.35 lbs/ft$^3$. The x may be 12 to 28. The slab's surface may be substantially free of bulging. The substrate may include wood fiber.

In a yet another embodiment, a method of forming a compressed horticultural slab is disclosed. The method may include filling a container with a fiber substrate having a plurality of loose metered fibers having initial loose bulk density ρ1. The method may further include pressing the fibers in the container for a dwell time under such pressure that a compression ratio of the initial to compressed fiber of 1:4 to 1:60 and final loose bulk density ρx is achieved, wherein ρx>ρ1, while the fibers obtain the shape and at least some dimensions of the container such that the slab is formed. The method may also include removing the slab from the container without compromising the shape and dimensions of the slab. The pressing may be provided in more than one stage. The dwell time may have the same value in each stage. The pressing may be provided in a temperature range of about 60 to 500 F (15.5 to 260° C.). The container may have a predetermined fill line and the filling may include filling the container with the fibers evenly below the fill line and unevenly above the fill line. The filling may include applying a lesser amount of fibers to a container's central portion than the amount of fibers provided around a perimeter of the container. The pressing may include decreasing a volume of non-capillary pores in the fiber substrate by compressing the substrate to the desired final loose bulk density ρx.

DETAILED DESCRIPTION

Figure 1:
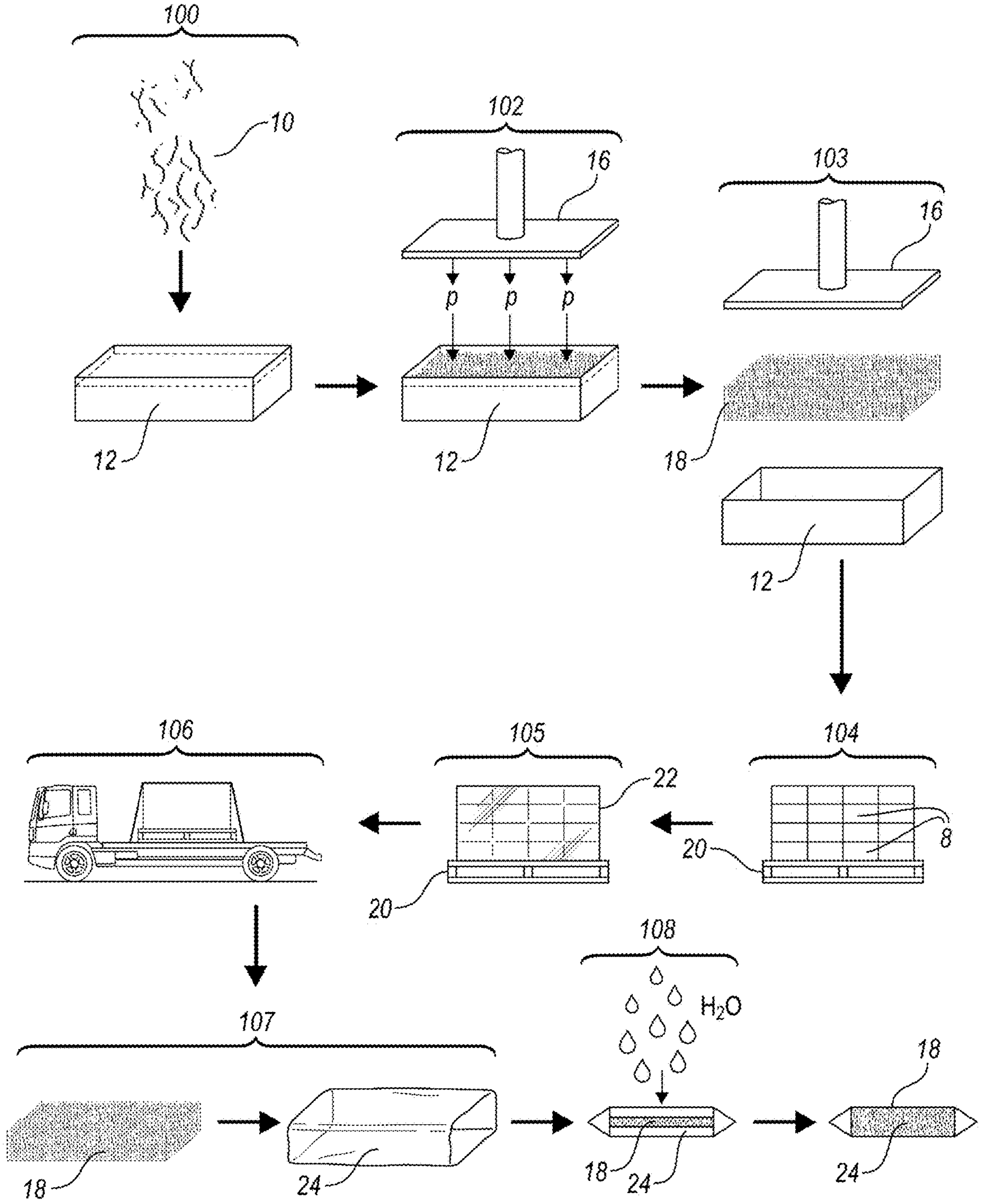
FIG. 1 provides a schematic flowchart illustrating the compression process of a fiber mixture according to one or more embodiments disclosed herein resulting in a compressed fiber product and additional optional steps including re-expansion of the compressed fiber product.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

In one or more embodiments, a method of producing a compressed fiber substrate is disclosed. The fiber substrate may be formed into a variety of products such as a slab or a plank. A slab or plank may be defined as an elongated substrate product including fiber. The compressed fiber substrate may be used for horticultural purposes such as hydroponics, seed germination, seedling support, plant growth, tissue culture, cuttings, transplants, the like, and/or other growing efforts of crops at various stages of growth.

The compressed fiber substrate disclosed herein may be produced by a method which substantially changes physical properties of the substrate, as is discussed in detail below. The method may be applicable to any fiber substrate-natural, synthetic, or their combination, as is discussed below.

The material the substrate may be formed from may include at least one type of fiber. The material may include a fiber mixture. The material may include a plurality of types of fiber. The material may include natural and/or synthetic fiber. The material may be exclusively natural such that the material is substantially free of synthetic components. The substrate is soil less or substantially or completely devoid of soil particles. The substrate may be organic. The substrate may be sterile or substantially free of pathogens.

The natural fiber may include one or more wood components including wood chips, wood fiber, bark, leaves, needles, or their combination. The wood components may be derived from coniferous and/or deciduous trees and may be prepared by any convenient manner, for example as disclosed in U.S. Pat. No. 2,757,150. Any type of wood components may be used, for example wood components of the softwood varieties such as yellow poplar, cedar such as Western red cedar, fir such as Douglas fir, California redwood, and particularly pine such as Ponderosa, Sugar, White, and Yellow varieties of pine. Other useful wood components may come from oak, walnut, mahogany (*Swietenia macrophylla, Swietenia mahagoni, Swietenia humilis*), hemlock, Douglas fir, arborvitae, ash, aspen, basswood, butternut, hornbeam, beech, alder, elm, birch, hemlock, hickory, larch, locust, maple, cottonwood, chestnut, Sitka spruce, sycamore, sassafras, shadbush, willow, fruit trees like cheery, apple, and the like, and combinations thereof.

For example, wood components may refer to fibrous tree wood components including just fibrous tree wood or fibrous tree wood as well as fibrous tree bark, needles, leaves, chips, or a combination thereof. The term "bark" refers to a plurality of stem tissues including one or more of cork (phellum), cork cambium (phellogen), phelloderm, cortex, phloem, vascular cambium, and xylem. Alternatively, the substrate may be free of bark, needles, leaves, chips, or a combination thereof. Further alternatively, the substrate may be free of one or more of bark, needles, leaves, chips, and a combination thereof.

The natural fiber may include peat, coco coir, rice hulls, plant fiber, animal fiber, cellulose fiber, paper, compost, seeds, the like, or a combination thereof. Peat refers to partially decayed organic matter harvested from peatlands, bogs, mires, moors, or muskegs. Coir refers to fiber from the outer husk of the coconut. Rice hulls or rice husks refer to the covering of grains of rice. Plant fiber includes cotton, flax, help, jute, sisal, ramie, kenaf, rattan, vine fiber, abaca, and the like. Animal fibers refer to any fiber generally made up of proteins. Animal fiber may include wool, cashmere, alpaca fiber, silk, camel hair, mohair or angora fiber, and the like. Cellulose fiber refers to fibers made with ethers or esters of cellulose, which can be obtained from the bark, wood or leaves of plants, or from other plant-based material. Paper refers to a thin material produced by pressing together moist fibers of cellulose pulp derived from wood, rags or grasses, and drying them into flexible sheets, which may be used herein in any form including paper fiber, paper strips, paper flakes, the like, or a combination thereof. Compost refers to any organic matter in different phases of decomposition. Seeds refer to embryonic plants enclosed in protective outer coverings. Seeds may come from any plant such as trees, shrubs, flowering plants. Alternatively, the substrate may be free of non-renewable resources such as peat. The substrate may be free of fiber from coco coir, rice hulls, animal fiber, cellulose, paper, or their combination. The substrate may be free of compost or seeds.

The substrate may include man-made fiber. The man-made fiber may include one or more types of man-made or synthetic fiber. The synthetic fiber may include any fiber manufactured from polymer-based materials such as thermoplastic fibers, polyolefins such as polyethylene, polypropylene, polyethylene terephthalate, polytetrafluoroethylene, polyphenylene sulfide, polyesters, polyethers such as polyetherketone, polyamide such as nylon 6, nylon 6,6, regenerated cellulose such as rayon, aramids known as Nomex, Kevlar, Twaron, fiberglass, polybenzimidazole, carbon/graphite, acetate, triacetate, vinyon, saran, spandex, vinalon, lastex, orlon, modal, dyneema/spectra, sulfar, lyocell, polybenzimidazole fiber, polylactide fiber, terylene, the like, or a combination thereof.

The man-made fiber may be a bicomponent fiber such that it contains at least two different types of material and/or fiber. The man-made fiber may include at least one kind of bicomponent fiber. The man-made fiber may include a plurality of bicomponent fibers, forming a mixture. Each fibrous piece may contain an outer shell made from the first fiber and an inner portion, a core, made from the second fiber. Having a bicomponent fiber may allow melting of a portion of the bicomponent fiber while allowing some of the fiber to remain in a non-melted state. Melting of the outer shell may enable adherence of the man-made fiber to the natural fiber while preserving structure of the man-made fiber as the inner core does not succumb to melting. Alternatively, a single component man-made fiber may be used in combination with an adhesive. The adhesive may be a natural or synthetic adhesive. The adhesive may be any adhesive or binder named below.

The man-made fiber or bicomponent fiber may include any artificial fiber. The man-made fiber may include as a core, the outer shell, and/or the single component the following: thermoplastic fibers, polyolefins such as polyethylene, polypropylene, polyethylene terephthalate, polytetrafluoroethylene, polyphenylene sulfide, polyesters, polyethers such as polyethereketone, polyamide such as nylon 6, nylon 6,6, regenerated cellulose such as rayon, aramid, fiberglass, polybenzimidazole, carbon/graphite, a combination thereof, or the like. For example, bicomponent fiber may include a polyester core and a polypropylene outer shell or sheet or polyethylene or linear low density polyethylene outer shell. In another example, the bicomponent fiber may include a polypropylene core and a polyethylene outer shell. In a yet another example, a polyamide core and a polyolefin outer shell may be included. The man-made fiber may include interlocking manmade fiber.

The man-made fiber may be hydrophobic or hydrophilic. The man-made fiber may be compostable, biodegradable. For example, the man-made fiber may be fiber designed to disintegrate within the same timeframe as the natural fiber included in the substrate. The man-made fiber may be biodegradable such that the material used lasts for the length of the growing season, but is relatively easily biodegradable afterwards. Alternatively, if non-biodegradable man-made fiber is used, the man-made fiber may be separated from the remaining components of the hydroponic growing medium after use and recycled. The man-made fiber may break down into non-toxic components when exposed to heat including melting temperatures.

The substrate may include additional fiber materials such as yard waste fiber, waste fiber from various manufacturing processes such as textile waste fiber, paper waste fiber, their combination, or the like.

The substrate may further include additional components. Examples of such additional components include, but are not limited to fertilizer(s), macronutrient(s), micronutrient(s), mineral(s), binder(s), natural gum(s), surfactant(s), and the like, and combinations thereof. Fertilizers such as nitrogen fertilizers, phosphate fertilizers, potassium fertilizers, compound fertilizers, and the like may be used in a form of granules, powder, prills, or the like. For example, melamine/formaldehyde, urea/formaldehyde, urea/melamine/formaldehyde and like condensates may serve as a slow-release nitrogenous fertilizer. Fertilizers having lesser nutritional value, but providing other advantages such as improving aeration, water absorption, or being environmental-friendly may be used. The source of such fertilizers may be, for example, agricultural materials, animal waste, or plant waste.

Nutrients are well-known and may include, for example, macronutrient, micronutrients, and minerals. Examples of macronutrients include calcium, chloride, magnesium, phosphorus, potassium, and sodium. Examples of micronutrients are also well-known and include, for example, boron, cobalt, chromium, copper, fluoride, iodine, iron, magnesium, manganese, molybdenum, selenium, zinc, vitamins, organic acids, and phytochemicals. Other macro- and micro-nutrients are well known in the art.

The substrate may also include binders or adhesives. The binders may be natural or synthetic. For example, the synthetic binders may include a variety of polymers such as addition polymers produced by emulsion polymerization and used in the form of aqueous dispersions or as spray dried powders. Examples include styrene-butadiene polymers, styrene-acrylate polymers, polyvinylacetate polymers, polyvinylacetate-ethylene (EVA) polymers, polyvinylalcohol polymers, polyacrylate polymers, polyacrylic acid polymers, polyacrylamide polymers and their anionic- and cationic-modified copolymer analogs, i.e., polyacrylamide-acrylic acid copolymers, and the like. Powdered polyethylene and polypropylene may also be used. When used, synthetic binders are preferably used in aqueous form, for example as solutions, emulsions, or dispersions. While binders are not ordinarily used in growing media, they may be useful in hydraulically applied growing media.

Thermoset binders may also be used, including a wide variety of resole and novolac-type resins which are phenol/formaldehyde condensates, melamine/formaldehyde condensates, urea/formaldehyde condensates, and the like. Most of these are supplied in the form of aqueous solutions, emulsions, or dispersions, and are generally commercially available.

The natural binders may include a variety of starches such as corn starch, modified celluloses such as hydroxyalkyl celluloses and carboxyalkyl cellulose, or naturally occurring gums such as guar gum, gum tragacanth, and the like. Natural and synthetic waxes may also be used.

A non-limiting example substrate may include about or substantially 100 wt. % wood components fiber such as fiber made from wood chips, wood chunks, the like, or a combination thereof. In another non-limiting example, the substrate may include 50, 55, 60, 65, 70, 75, 80, 81, 82, 83, 84, 85, 86, 87, 88, 89, 90, 91, 92, 93, 94, 95, 96, 97, 98, or 99 wt. % wood components. The substrate may be free of bark or substantially free of bark. The substrate may contain natural dyes, artificial dyes, or their combination. The substrate may also include sawdust or a plurality of powdery particles of wood.

In a yet another non-limiting example, the substrate may include a blend of cellulose fiber and wood fiber, paper flakes or paper fiber and wood fiber, or coir fiber and wood fiber in a variety of ratios.

The substrate may include at least a first type of fiber and a second type of fiber in a weight or volume ratio. For example, the weight or volume ratio of the first fiber type or component to the second fiber type or component may be 5:95, 10:90, 15:85, 20:80, 25:75, 30:70, 35:95, 40:60, 45:55, or 50:50. Alternatively, the substrate may be a blend of more than two types of fiber and include a third, fourth, fifth, sixth, seventh, eight, ninth, or tenth type of fiber in a weight or volume ratio. Example weight or volume ratios may include 5:25:70, 10:20:70, 20:20:60, 20:30:50, 20:40:40, 33:33:33, 5:5:20:70, 10:10:20:60, 10:20:30:40, 20:20:20:40, 25:25:25:25, 20:20:20:20:20, etc.

The fibrous substrate may be sterilized during the fiber production process, after the fiber production process, during the compression process, after the compression process, or a combination thereof to result in a sterile product. Sterility enables transportation around the world without the risk of pathogen contamination, which is an occurring problem for some of the typical media as coir.

The fibrous substrate may be prepared by a process described in U.S. Pat. Nos. 10,266,457 and 10,519,373, which are hereby incorporated by reference in their entirety. The process includes steps a)-e). In step a), an initial composition is formed by combining material(s) the fiber is made from such as wood components, tree bark, etc. and/or any other material named herein. In step b), the initial composition is heated to an elevated temperature to kill microorganisms in a pressurized vessel. Typically, the heating step may be conducted at a temperature in the range of about 250° F. (121° C.) or lower to about 500° F. (260° C.) or higher, about 300° F. (149° C.) to about 400° F. (204° C.), about 320° F. (160° C.) to 380° F. (about 193° C.). The heating step may be conducted for a time sufficient to kill microbes. The heating step may be conducted for about 1 to about 5 minutes or longer under a steam pressure of about 35 lbs/in$^2$ (2.4 kg/cm$^2$) to about 120 lbs/in$^2$ (8.4 kg/cm$^2$) or about 50 lbs/in$^2$ (3.5 kg/cm$^2$) to about 100 lbs/in$^2$ (7.0 kg/cm$^2$). For example, the heating step may be conducted at a temperature of about 300° F. (149° C.) for about 3 minutes at about 80 lbs/in$^2$ (5.6 kg/cm$^2$). For example, the heating step may be conducted at a temperature of about 300° F. (149° C.) for about 3 minutes. The heating step results in a substantially sterile fiber such that the fiber is free from bacteria or other living organisms. The steam flow rate during the heating step may be from about 4,000 lbs/hour (1814 kg/hour) to about 15,000 lb/hour (6803 kg/hour).

An example of a pressurized vessel and related process for step b) is disclosed in U.S. Pat. No. 2,757,150, which has been incorporated by reference, in which wood chips are fed to a pressurized steam vessel which softens the chips.

In step c), the initial composition is processed through a refiner to form the fiber. The refiner may use a plurality of disks to obtain the fiber. The refiner may use two or more disks, one of which is rotating, to separate wood, bark, peat, coir fibers from each other as set forth in U.S. Pat. No. 2,757,150, the entire disclosure of which is hereby incorporated by reference. The refiner is usually operated at a lower temperature than the temperature used in step b). The refiner may be operated at a temperature in the range of about 70° F. (21° C.) to about 400° F. (204° C.), about 150° F. (66° C.) to about 350° F. (176° C.), about 200° F. (93° C.) to about 300° F. (148° C.). The refiner may be operated under steam. The refiner may be operated at atmospheric pressure or elevated pressures such as pressures of about 50 lb/in$^2$ (3.5 kg/cm$^2$) or lower to about 100 lb/in$^2$ (7.0 kg/cm$^2$). Some of the additional components may be added during step c) such as a dye or a surfactant.

In step d), the fiber is dried at temperatures of about 400° F. (204° C.) to about 600° F. (316° C.) for the time sufficient to reduce the moisture content of the fiber to a value less than about 45 weight %, less than about 25 weight %, less than about 20 weight %, or less than about 15 weight %, based on the total weight of the natural fiber portion 20. The drying step may be about 1 to 10 seconds long, about 2 to 8 seconds long, about 3 to 5 seconds long. The drying step may be longer than 10 seconds. Exemplary equipment for drying of the fiber in step d) may be a flash tube dryer capable of drying large volumes of the fiber in a relatively short length of time due to the homogeneous suspension of the particles inside the flash tube dryer. While suspended in the heated gas stream, maximum surface exposure is achieved, giving the fiber uniform moisture.

The combination of steps b), c), and d) may result in a stable fiber which may be sterile. In an optional step e), the fiber is further refined, and the additional components named herein may be added. Any synthetic fiber may be added at this step. The fiber is a loose fiber mixture.

The moisture content of the loose fiber mixture may be from about 10 to about 50 weight %, about 20 to about 40 weight %, or about 25 to about 35 weight % of the total weight of the fiber. The moisture content of the loose fiber may be about 10, 11, 12, 13, 14, 15, 16, 17, 18, 19, 20, 21, 22, 23, 24, or 25%. The moisture content of the loose fiber may be at, below, or at most about 20%. As is discussed below, a relatively high moisture content (30% or higher) may increase the degree of fiber rebound after compression. While certain degree of rebound is acceptable, it is desirable to minimize rebound and re-expansion of the compressed fiber prior to rehydration. As such, the initial moisture content may be below about 30, 25, or 20%.

The fiber mixture may be loose metered fiber having loose bulk density $\rho 1$. The fiber may be compressed such that the resulting compressed fiber has loose bulk density $\rho x$, where $\rho x$ has a higher value than $\rho 1$, indicating that the compressed fiber is denser, more concentrated, more compacted than the loose metered fiber. In one embodiment, the compressed fiber may be compressed by about, at least about, or more than about 1,000 to 6,000%. In another embodiment, the compressed fiber may be compressed by about, at least about, or more than about 1,250 to 5,000%. In yet another embodiment, the compressed fiber may be compressed by about, at least about, or more than about 2.00 to 3,500%. In still yet another embodiment, the compressed fiber may be compressed by about, at least about, or more than about 1,200 to 1,500%. The compressed fiber may be compressed by about, at least about, or more than about 50 to 6,000, 100 to 5,000, 150 to 4,000, 200 to 3,000, 300 to 2,000, 400 to 1,500, or 500 to 1,000%. The final compression of the loose meter fiber may be about, at least about, more than about, less than about, or greater than about 50 to 6,000, 100 to 5,000, 200 to 4,000, 300 to 2,500, 400 to 1,500, or 500 to 1,000%. The compression may be about, at least about, more than about, less than about, or greater than about 50, 100, 150, 200, 250, 300, 350, 400, 450, 500, 550, 600, 650, 700, 750, 800, 850, 900, 950, 1,000, 1,050, 1,100, 1,150, 1,200, 1,250, 1,300, 1,350, 1,400, 1,450, 1,500, 1,600, 1,700, 1,800, 1,900, 2,000, 2,100, 2,200, 2,300, 2,400, 2,500, 2,600, 2,700, 2,800, 2,900, 3,000, 3,100, 3,200, 3,300, 3,400, 3,500, 3,600, 3,700, 3,800, 3,900, 4,000, 4,100, 4,200, 4,300, 4,400, 4,500, 4,600, 4,700, 4,800, 4,900, 5,000 5,100, 5,200, 5,300, 5,400, 5,500, 5,600, 5,700, 5,800, 5,900, or 6,000%. The compression ratio of a compressed fiber substrate to the fiber substrate before compression may be about, at least about, more than about, less than about, or greater than about 1.5:1, 2:1, 2.5:1, 3:1, 3.5:1, 4:1, 4.5:1, 5:1, 5.5:1, 6:1, 6.5:1, 7:1, 7.5:1, 8:1, 8.5:1, 9:1, 9.5:1, 10:1, 10.5:1, 11:1, 11.5:1, 12:1, 12.5:1, 13:1, 13.5:1, 14:1, 14.5:1, 15:1, 15.5:1, 16:1, 16.5:1, 17:1, 17.5:1, 18:1, 18.5:1, 19:1, 19.5:1, 20:1, 25:1, 30:1, 35:1, 40:1, 45:1, 50:1, 55:1 or 60:1. Any density ρx within the range of numbers named above is contemplated.

The final loose bulk density of the compressed fiber may be defined by a formula (I):

$$\rho x = \rho 1 * x, \tag{I}$$

where:

ρx is the final loose bulk density,

ρ1 is the initial loose bulk density, and x is the compression factor including any number between 4 and 60, x may be 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60, or any range including any of two numbers disclosed herein.

In a non-limiting example, loose metered fiber or fiber mixture may have loose bulk density ρ1=1.35 $lbs/ft^3$ before compression. The fiber mixture is then compressed to ρ2=2.7 $lbs/ft^3$ which represents 2× or 200% compression, resulting in a 100% increase in density of ρ1. The fiber mixture may be further compressed to achieve additional compression. For example, the fiber mixture may be compressed to ρ3=5.5 $lbs/ft^3$, which represents 4× or 400% compression, compared to the initial loose metered fiber, resulting in a 300% increase in density of ρ1. Furthermore, the compression may be to ρx=3.375 $lbs/ft^3$ representing 2.5× or 250% compression, 4.05 $lbs/ft^3$ representing 300% compression, 6.75 $lbs/ft^3$ representing 500% compression, 8.1 $lbs/ft^3$ representing 600% compression, 9.45 $lbs/ft^3$ representing 700% compression, 10.8 $lbs/ft^3$ representing 800% compression, 12.15 $lbs/ft^3$ representing 900% compression, or 13.5 $lbs/ft^3$ representing 1000% compression, etc.

The loose fiber prior to compression may have non-limiting example loose bulk density ρ1 of about 0.5 to 2.5, 1 to 2, or 1.1 to 1.5 $lb/ft^3$. The loose fiber may have non-limiting example loose bulk density ρ1 of about 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, or 2.5. The compressed fiber may have non-limiting compressed fiber loose bulk density ρx of about 2 to 30, 5 to 25, or 8 to 20 $lb/ft^3$. In other embodiments, the compressed fiber may have non-limiting compressed fiber loose bulk density ρx of about 2 to 60, 5 to 50, or 8 to 40 $lb/ft^3$. The compressed fiber may have non-limiting compressed fiber loose bulk density ρx of about 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45, 45.5, 46, 46.5, 47, 47.5, 48, 48.5, 49, 49.5, 50, 50.5, 51, 51.5, 52, 52.5, 53, 53.5, 54, 54.5, 55, 55.5, 56, 56.5, 57, 57.5, 58, 58.5, 59, 59.5, or 60 $lb/ft^3$. After rehydration and expansion such as in a grow bag, the rehydrated fiber may have non-limiting example loose bulk density ρz of about 4 to 15, 5 to 10, or 6 to 8 $lb/ft^3$. After rehydration and expansion such as in a grow bag, the rehydrated fiber may have non-limiting example loose bulk density ρz of about 4, 4.5, 5, 5.5, 6, 6.5, 7, 7.5, 8, 8.5, 9, 9.5, 10, 10.5, 11, 11.5, 12, 12.5, 13, 13.5, 14, 14.5, or 15 $lb/ft^3$. The relationship between the densities is such that $\rho 1 < \rho z < \rho x$.

As was indicated above, the compression may be pursued in one or more stages. For example, the compressing process may include an initial compression, secondary compression, tertiary compression, etc. Compression such as the initial compression may be performed by pressing the loose metered fiber into a container having a volume Vc for a period of time or dwell time t. The container volume Vc may be about 3 to 5 $ft^3$. The container volume Vc may be about 0.025 to 20, 0.1 to 10, or 0.25 to 2 $ft^3$. The container volume Vc may be about 0.025, 0.05, 0.075, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, or 20.0 $ft^3$.

The container may have any size, shape, cross-section, or configuration. For example, the container may be a box, bucket, canister, capsule, carton, chamber, crate, enclosure, pail, pot, tank, tub, or vessel. The container may be open such as for example a mat, or belt, running through a compression process, such as through one or more press stations containing one or more rollers. The container may have a shape of a cube, cuboid, cylinder, rectangular prism, or rectangular parallelepiped. Other shapes are contemplated. A preferred shape may be a rectangular prism or a cuboid.

The container includes a main chamber into which loose metered fiber is deposited for compression and a pressing member via which pressure is applied to the fiber. The pressing member may be a top member, ram, press, or lid, having dimensions and shape which correspond to the dimensions and shape of the container. In other embodiments, the pressing member may be one or more rollers and/or drums. Also, in at least one embodiment, multiple pressing stations having one or more pressing members are employed.

The container, the pressing member, or both may be made from any material as long as the material is sturdy enough to keep the container's shape under a pressure. The pressure may be a range of pressures under which the fiber is being compressed once in the container. The container, the pressing member, or both should withstand a range of pressures exerted by the fiber being compressed against the container, the container's bottom portion, container's side portions (if present), or a combination thereof. The container, the pressing member, or both should be able to withstand the pressure once or repeatedly. The container and the pressing member may be made from the same or different materials.

The container, the pressing member, or both may be made from a metal, alloy, plastic, fabric, composite, glass, metallic glass, wood, brick, concrete, the like, or a combination thereof. The metals and/or alloys may include steel such as stainless steel, high strength steel, carbon steel, iron, chromium, etc. The plastic may include impact resistant plastics such as high-density polyethylene (HDPE), high impact polystyrene (HIS), acrylonitrile butadiene styrene (ABS), fluoropolymers, polyethylene terephthalate (PETG). Composites may include glass or fiber reinforced thermosets such as thermoset polyesters, glass/epoxy, the like, or a combination thereof. The container may be at least partially see-through for visual inspection of the compression process and/or compressed fiber product.

The compression in at least one or more stages may last for a period of time or dwell time of about, at least about, or no more than about 0.1 to 120, 0.5 to 100, 1 to 90, 1.5 to 60, 2 to 50, 3 to 40, 4 to 20, or 5 to 10 s. The dwell time may be about 3 to 40 s or 15 to 20 s. Also, the dwell time could be longer and/or shorter, such as about 0.5 to 360 s, 1 to 300 s, or 2 to 180 s. The dwell time refers to the amount of time during which pressure is applied to the fiber via the pressing member. The dwell time, the compression time period, or a single stage of the compression process may last about, at least about, or at most about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.2, 5.4, 5.6, 5.8, 6.0, 6.2, 6.4, 6.6, 6.8, 7.0, 7.2, 7.4, 7.6, 7.8, 8.0, 8.5, 9.0, 9.5, 10, 10.5, 11, 11.5, 12, 12.5, 13, 13.5, 14, 14.5, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120 s. The compression process may have any number of stages as long as the ρx value and/or predetermined dimension of the compressed fiber are achieved. Each stage of the compression process may last the same or different amount of time as at least one another stage.

In a non-limiting example, the compression process may be done in three steps or stages, each stage having a dwell time of about 1 s. In another embodiment, the compression process has only two steps, each lasting a different amount of time, the first stage having a dwell time of about 2 s, the second stage having a dwell time of about 1.5 s. In an alternative embodiment, the compression process is a single-step process having a dwell time of about 3 s. In a yet another embodiment, the dwell time in each stage may about be about 20-30 s.

The compression process may be performed in an ambient temperature. Alternatively, the fiber may be compressed during an elevated temperature. The compression temperature may be in a range of about 60 to 500 F, 80 to 400 F, 100 to 300 F, or 170 to 270 F (15.5 to 260° C., 27 to 204° C., 38 to 149° C., or 77 to 132° C.). The compression temperature may be about 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350 355, 360, 365, 370, 380, 385, 390, 395, 400, 405, 410, 415, 420, 425, 430, 435, 440, 445, 450, 455, 460, 465, 470, 475, 480, 485, 490, 495, 500 F, or a range of any two numbers named herein.

An elevated temperature may reduce the dwell time and potential rebound of the fiber after the compression process is ended. Compression temperatures below the range may result is an increase of dwell time. Without limiting the disclosure to a single theory, it is believed that the temperature within the named ranges contributes to a tighter hold between the fibers, as is explained below, and to increased pressure inside the compressed fiber slab by a transfer of water vapor towards the center of the slab.

The compression process may result in a compressed fiber mixture having the shape and at least some dimensions of the container. The dimensions may include width and thickness. The dimensions may be predetermined dimensions. The compressed fiber product may be a slab. The compressed fiber product may have a thickness or height h, width w, and length l. The h, w, and l may match the dimensions of a grow bag or a grow bag sleeve. Example height h may be about, at least about, or at most about 2 to 10, 3 to 8, or 4 to 6 inches or 5.1 to 25.4, 7.6 to 20.3, or 10.2 to 15.2 cm. The width w may be about, at least about, or at most about 3 to 10, 4 to 20, 6 to 16, or 8 to 12 inches or 4.6 to 25.4, 10.2 to 50.8, 15.2 to 40.6, or 20.3 to 30.5 cm. The length l may be about, at least about, or at most about 5 inches to 10 feet, 10 inches to 8 feet, or 50 inches to 5 feet or 12.7 cm to 3 m, 25.4 cm to 2.4 m, or 1.27 m to 1.52 m. A non-limiting example compressed slab may have the following dimensions: 39.5"×8"×3" (100 cm×20 cm×7.5 cm) or 39.5"×6"×4" 100 cm×15 cm×10 cm.

As was described above, a container is filled with the fiber mixture during the compression process. The process may include filling the container in a specific manner such that the resulting compressed product has an even surface not only after the compression process is complete, but also after the compressed product is inserted in a grow bag and expanded by a customer. This may be achieved by filling the container evenly until a predetermined fill line of the container. Above the fill line, the container may be filled unevenly such that less fiber is provided within a central portion of the container and more fiber is distributed into the corner and edge portions (perimeter) of the container. The fill line may be located at the bottom, middle, or top portion of the container. The location of the fill line may differ depending on the type of fiber mixture, final dimensions desired, final density desired, other factors, or their combination. The process may include filling the container with the fiber mixture in such a way that lowest density or concentration of the fiber is in the central portion of the container and the highest density or concentration of the fiber is in the corner and edge portions of the container. The compressed product may also have uniform density of fiber throughout the slab, and retain uniform density throughout the slab after rebound and after rehydration.

The compressed product may be shipped as is or additionally processed. For example, the process may also include precutting or pre-marking openings or semi-openings in the top surface of the product. Alternatively, the product may be formed as a slab and be opening free. The product may be individually wrapped or loaded onto a latter and wrapped as a bulk. The product may be shipped and once received by a customer, placed in a grow bag, wrap, enclosing, casing, pouch, sack, packet, cover, etc. and rehydrated by adding moisture to the compressed product. The grow bag may be made from a fabric, paper, cellulose, or plastic or another breathable material having good drainage properties. Upon rehydration, the compressed product expands within the grow bag to the dimensions of the grow bag. In non-limiting examples, an initial thickness of the fibers of about 20 to 28 inches thick may be pre-pressed to about 4 to 8 inches thick, with optional heat, and then compressed, again with option heat, to about ⅛ to ¾ inches thick. In other non-limiting examples, an initial thickness of the fibers of about 22 to 24 inches thick may be pre-pressed to about 5 to 6 inches thick, with optional heat, and then compressed, again with option heat, to about ¼ to ½ inches thick. In non-limiting examples, each grow bag may contain in 2-8, and in another embodiment 3-6, slabs and each slab may be between ⅛ to ¾ inches thick, and in another embodiment, ¼ to ½ inch thick. After wetting, again in non-limiting examples, each slab may expand 100 to 600%, in other embodiments, 150 to 500%, and in yet other embodiments 200 to 400% in thickness.

A non-limiting schematic process described herein is depicted in FIG. 1. The fiber mixture 10 is distributed into the container 12 in step 100. As was discussed above, the filling may be done in a specific way such as until the fill line 14, the fiber is distributed uniformly. Above the fill line 14, the fiber is distributed unevenly, as described above. In step 102, the pressing member 16 is applied onto the fiber mixture 10 within the container 12 until desired density and/or dimensions of the compressed fiber are achieved. The applying may be performed for a dwell time discussed above and may be done in stages or steps, as was described above. In step 103, the compressed product 18 is removed from the container 12. Steps 104 to 108 are optional steps. In step 104, a plurality of compressed products 8 is loaded onto a pallet 20. In step 105, the compressed products 18 are provided with a protection cover such as a plastic wrap. In step 106, the compressed products 18 are transported to a customer. In step 107, the individual compressed products are each provided with a grow bag 24 and inserted within a grow bag 24. In step 108, the compressed product 18 in expanded within the grow bag 24 by applying moisture such as water to the compressed product 18. The resulting product includes fiber expanded within the grow bag 24 to the dimensions of the grow bag 24.

It was unexpectedly discovered that the fiber compression process affects desirable physical properties of the fiber mixture. Specifically, water holding capacity (WHC) and air space of the fiber mixture may be altered by the compression process described herein. Both of these properties are important in seed propagation, seedling growth, plant growth, and hydroponic growing.

WHC relates to an amount of water a substrate is capable of retaining and corresponds to capillary pore cavities in the substrate. Air space or air holding capacity relates to the amount of air available to the plant in a substrate and corresponds to non-capillary pore cavities in the substrate. The quantity of both types of the pore cavities—capillary and non-capillary—influence how water moves through a substrate. To support horticultural efforts such as hydroponic growing, a substrate should be well-graded and include pore spaces which range between large and fine, but also include intermediate pore spaces such that water may move continuously, fluidly or steadily through the substrate without a break in hydraulic conductivity and without a change from a water flow to vapor transport instead of direct water flow alone.

It was unexpectedly discovered that the compression process changes the amount and volume of capillary and non-capillary pores as well as a ratio of the capillary to non-capillary pores in the fiber mixture. Specifically, as the loose metered fiber is compressed in the one or more stages of the compression process described herein, the density of the fiber, WHC and/or the volume of capillary pores or cavities increase. At the same time, the air space or volume of non-capillary pores or cavities within the fiber mixture decreases with the increasing density.

The pores serve as fluid or water conduits. Capillary pores are micropores or pores with diameters less than 2 nm. Capillary water is held in the capillary pores by capillary forces. The water in the capillary pores is held so strongly that gravity cannot remove the water from the substrate.

The non-capillary pores or cavities are rapidly draining pores or cavities which do not hold water tightly through capillary forces. The non-capillary pores are macropores or cavities that are larger than 75 μm. The non-capillary pores allow percolation of water and entrance of air.

The process includes compressing the larger non-capillary pores or air spaces within the fiber mixture into smaller capillary pores or cavities. The process thus physically alters structure of the fiber mixture. The process includes reducing the macropores into micropores within the fiber mixture. The process includes reducing a certain amount or volume of macropores into micropores. The process may include reducing an initial amount or volume Vnc1 of non-capillary pores or macropores to a secondary or final amount or volume of macropores Vnc2. Vnc1 may be reduced by about, at least about, or not greater than about 1, 2, 3, 4, 5, 6, 7, 8, 9, 10, 15, 20, 25, 30, 35, 40, 45, 50, 55, 60, 65, 70, 75, 80, 85, 90, 95, or 99%. Vnc1 may be reduced by about, at least about, or not greater than about 85 to 90%. Vnc2 may be about 1, 2, 3, 4, 5, 6, 7, 8, 9, 10, 15, 20, 25, 30, 35, 40, 45, 50, 55, 60, 65, 70, 75, 80, 85, 90, 95, or 99% of Vnc1. Vnc2 may be reduced to about 1 to 10, 2 to 8, or 4 to 6% of Vnc1 during the process described herein.

The process may include increasing an initial amount or volume Vc1 of capillary pores or micropores to a secondary or final amount or volume of micropores Vc2. Vc1 may be increased by about, at least about, or not greater than about 1, 2, 3, 4, 5, 6, 7, 8, 9, 10, 15, 20, 25, 30, 35, 40, 45, 50, 55, 60, 65, 70, 75, 80, 85, 90, 95, or 99%. Vc1 may be about 1, 2, 3, 4, 5, 6, 7, 8, 9, 10, 15, 20, 25, 30, 35, 40, 45, 50, 55, 60, 65, 70, 75, 80, 85, 90, 95, or 99% of Vnc2.

In the non-limiting example mentioned above, the loose metered fiber mixture may have loose bulk density $\rho 1=1.35$ $lbs/ft^3$ before compression. The fiber mixture is then compressed to $\rho 2=2.7$ $lbs/ft^3$ which represents 200% compression. The compression results in x1 WHC (capillary pore cavities) and y1 air space (non-capillary pore cavities). The fiber may be further compressed to achieve additional compression. For example, the fiber may be compressed to $\rho 3=5.5$ $lbs/ft^3$, which represents compression of 400% compared to the initial loose metered fiber. The additional compression generates x2 WHC and y2 air space, where $x2>x1$ and $y1>y2$. Additional compression would yield x3 WHC, where $x3>x2>x1$ and air space y3, where $y3<y2<y1$.

The process thus includes altering physical properties of a fiber mixture of the fiber substrate, changing pore cavity structure of the fiber substrate at a density higher than loose bulk density. The process includes increasing density and WHC of the fiber substrate. The process includes decreasing air space of the fiber substrate. The process includes increasing a volume of capillary pore cavities in a fiber substrate by compressing the substrate to a desired degree of compactness ρx. The process includes decreasing a volume of non-capillary pores in the fiber substrate by compressing the substrate to a desired degree of compactness ρx.

The greater the compression, the smaller the pore size is achieved. The smaller the pores size, the higher the WHC and lower the air space. The process may include determining the desired ratio of micropores:macropores for a fiber substrate to be compressed. The determining may be conducted before, during, and/or after the compression process. The process may include, for example, determining WHC and air space of the loose meter fiber and/or the compressed fiber. The determining may include arriving at a ratio or value designated for ideal/threshold substrate conductivity. The determining may include measuring WHC, air space capacity, or both by one or more methods.

Example non-limiting methods for measuring WHC and air space may include a Container Capacity test which measures the percent volume of a substrate that is filled with water after the growing medium is saturated and allowed to drain. It is the maximum amount of water the substrate can hold. The drainage is influenced by the height of the substrate; this property is thus dependent on container size. The taller the container, the more drainage it will cause, and the less capacity of the substrate to hold water. The oxygen holding capacity is measured as percent volume of a substrate that is filled with air after the substrate is saturated and allowed to drain. It is the minimum amount of air the material will have. It is affected by the container height in reverse fashion to container capacity; i.e., the taller the container, the more drainage and therefore more air space.

Alternatively, WHC may be measured by ASTM D7367-14, a standard test method for determining water holding capacity of fiber mulches for hydraulic planting. Alternatively still, the air holding capacity of a substrate may be assessed based on a water retention curve comparison focusing on the amount of water which is available to the plant once grown in the substrate. Substrates, both soil-based and soil-less, may be classified based on particle and pore size analysis as either uniform, well, or gap graded. Uniform graded substrates include particles and pores of similar diameter. An example of a uniform substrate may be sand. Well graded substrates include particles and pores of various sizes, but contain a consistent gradation of the particles from large particles to fine particles. In a well-graded substrate, the pore spaces also range between large and fine. A well graded substrate is, for example, silt loam. Gap graded substrates, on the other hand, include large particles and fine particles, but lack intermediately sized particles. Thus, the pores in a gap graded substrate are either large or small, and a gap of intermediate or mid-size particles exists. An example gap graded substrate is bark.

When intermediate sized pores are absent, water does not move easily between the large and small pores. Thus, a missing pore size may cause a break in hydraulic conductivity. Water may still move from the large pores to the small pores, but the transport happens via vapor phase transport instead of direct water flow. An optimal growing substrate is a well graded substrate having large, mid-size, and small particles and pores. A well-graded substrate is capable of maintaining hydraulic conductivity which is beneficial to maximizing plant available water. The gradual pore distribution in a well-graded substrate thus allows continuous movement of water from large to small pores.

The process may thus include determining WHC and air space of the initial loose metered fiber mixture, assessing threshold pore size distribution in the fiber mixture, and compressing the fiber mixture to achieve the threshold pore size distribution. The determining of the threshold pore size distribution may be done experimentally or mathematically.

The compression process described herein has additional advantages. For example, the compression enables reduction of at least one dimension of the fiber compressed article or product such as a slab compared to metered loose fiber. The dimension may be height or length. The reduction may be about, at least about, or greater than about 5, 10, 15, 20, 25, 30, 35, 40, 45, 50, 55, 60, 65, 70, 75, 80, 85, or 90%. The reduction may be about, at least about, or greater than about 90 to 95%. In turn, reduction in dimensions leads to an increased amount of individual articles which may be loaded onto pallets, a transportation vehicle, or both.

After the compression, the resulting compressed product is free of any bulging, has a relatively uniform, flat surface, stable dimensions and uniform density throughout the slab, well-defined corners and sides. Free of any bulging relates to a shape free of lumps, bumps, nodules, bunching, or another interruptions of a flat surface. The compressed product retains its shape and properties even during and after transportation, placement in a grow bag, and/or rehydration. In other words, the compressed product retains its shape and remains free of bulging after the product is re-expanded by adding moisture to the compressed product. At the same time, the product has well-defined edges, corners, sides, top, and bottom surfaces. The product is also more flexible than and less rigid than pure coir fiber planks, which tend to break relatively easily. The slab resists breakage.

Without limiting the disclosure to a single theory, it is believed that at least some of the fiber in the fiber mixture to be compressed has twists, tangles, coils, bends, curves, crinkles, crimps, wrinkles, etc. such that at least some of the fiber is not straight along its length during the pre-compression state. During the compression, the twists become folds or furrows such that the twists become more rigid and the fiber holds its curved, folded, or twisted shape. Below the about 20% moisture content, the folds hold their shape as the amount of pressure, compression temperature, and/or duration of the compression process increase. The compression process may be terminated at the point when the folded fibers remain in their folded state. Upon raising the moisture to above about 20% moisture content, the fiber starts rehydrating. During rehydration, the fiber swells such that the water droplets penetrate within the fiber and the folds partially open. At least some of the compressed fiber thus includes partially unfolded fibers which may push against the remaining fibers, causing partial re-expansion of the fiber in the direction of the original pre-compression twists. While some of the fiber partially reopens during the rehydration state, the fiber includes sufficient amount of tangled fiber that the spring-back is limited to the about 1-10 volume %, as is discussed herein, even when rehydration results in moisture content in a range between about 40% to 80% volumetric water content after saturation and drain.

After the compression, the compressed product substantially holds its shape and dimensions. But the compressed product may rebound or spring back to a certain degree such that at least one or one dimension of the compressed product may increase after compression and after the product is removed from the container, but prior to rehydration. An example dimension may be height of the compressed product. The height increase may be due to material rebound as the fiber's elastic properties tend to spring the fiber back to its original loose fiber form. It is believed that certain environmental conditions such as elevated heat, initial moisture content, as well as physical handling may increase the rebound. On the other hand, it was found that increasing hold time, pressure, press temperature, or a combination thereof in the container will minimize and/or eliminate rebound. The overall rebound or increase in volume of the compressed product may be about 1-10 volume %.

The compressed fiber may have lower moisture content than traditional grow bag products as a result of the processes described herein. As a result, the compressed fiber has lower weight for transportation purposes and greater expansion upon rehydration than traditional grow bag products. Even upon expansion due to rehydration, the product described herein may have and/or retain a lower moisture content than the traditional grow bag products, which may have an impact on plant growth. Specifically, the relatively low moisture content of the product described herein may steer a plant to be more generative, forcing the plant to focus on producing seeds and fruits instead of stems, leaves, and roots.

Additionally, the compressed fiber may be prepared from certified organic materials to produce a certified organic slab for hydroponic or other horticultural applications. The compressed fiber product may be disposed of in an environmentally-friendly way, for example by burning for heating purposes, recycling, or composting. For example, the compressed fiber product may be burned after the end of the growing season to heat up a greenhouse. Burning of the compressed product may also result in less ash than burning of alternative horticultural products. For example, in an example ash test, the compressed fiber product including wood chips and natural dyes resulted in less ash than coco coir planks.

Furthermore, the compression process allows reduction of carbon footprint in a number of ways. Firstly, the reduction in the compressed fiber product dimensions enables loading and transportation of an increased volume of product. Secondly, once the compressed fiber product's horticultural purpose has ended, it may be used as a source of energy. Additionally, the compressed fiber product's beneficial properties enhance growing potential and yield, thus enabling increased plant and fruit growth. Thus, to generate the same amount of fruit, lesser amount of fiber mixture is needed if the growing is conducted via the compressed product than if an alternative product is used.

EXAMPLES

Example 1

In a non-limiting example, a loose metered fiber substrate has a ρ1. The substrate is compressed to ρ2 which is 2 times smaller than ρ1, translating to 200% compression. The WHC and air space of the compressed fiber is assessed, and it is determined that further compression is desirable to increase WHC and reduce air space. The assessment may include determination of the ratio of Vnc:Vc at 200% compression. The process may include additional compression of the fiber substrate to ρ3 which is 3 times smaller than ρ1, translating to 300% compression. The assessment may include determination of the ratio of Vnc:Vc at 300% compression.

Example 2

Figure 2:
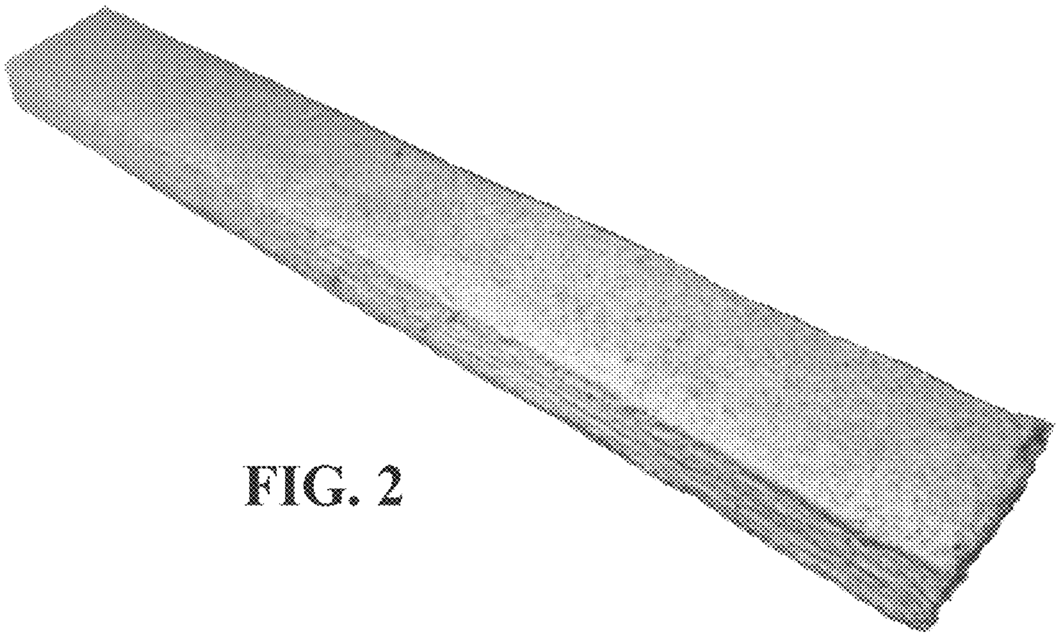
FIGS. 2 and 3 are photographs of a non-limiting example of a compressed fiber product produced by the compression method described herein.
Figure 3:
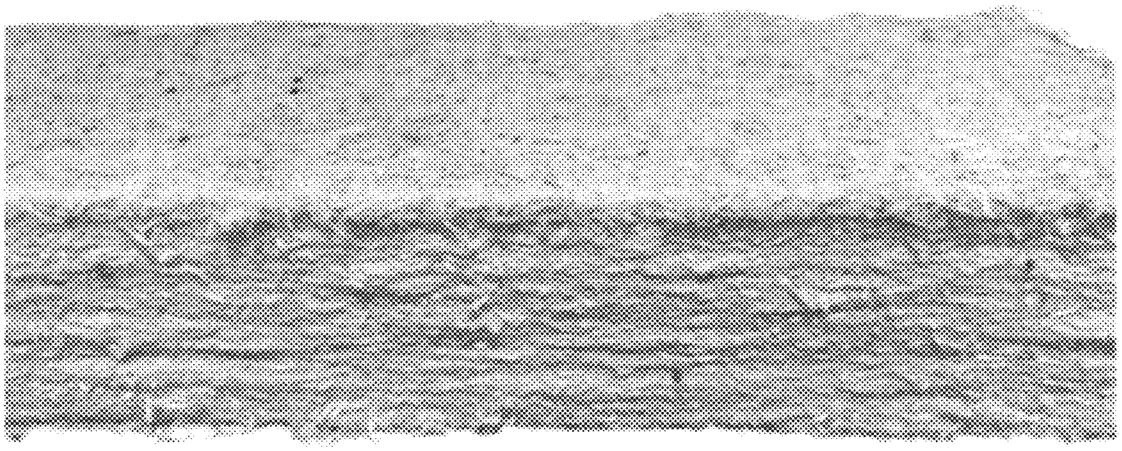

A bark-free fiber substrate including wood fiber from wood chips and natural dyes was compressed in a 13:1 compression ratio to a 50 lbs bale. The bale may be transported, opened by a wood fiber opening apparatus, and expanded to a loose bulk density of about 1.3 lbs/ft$^3$. The fiber was then conveyed to a weigh chamber, about 1.925 lbs of the loose metered fiber was weighed and conveyed to a compression container. The container was a chamber having a rectangular cross-section of the following dimensions: 10"×4.5" or 25.4 cm×11.43 cm. The height of the chamber was about 8' or 2.43 m. Once the fiber was metered into the chamber, a pressing member was suspended into the chamber to compress the metered fiber. The pressing member had the same dimensions as the rectangular cross-section of the chamber: 10"×4.5" or 25.4 cm×11.43 cm. The pressing member was a rod with a plate. The pressing member was applied to the fiber for a dwell time until the fiber reached predetermined dimensions of 13.5"×10"×4.5" or 34.3 cm×25.4 cm×11.43 cm and predetermined density of 607.5 in$^3$ or 0.3515 ft$^3$. Pressure was applied via the pressing member for the dwell time of about 1 s before the pressing member was lifted off of the fiber and out of the chamber. A photograph of the wood-fiber product is shown in FIGS. 2 and 3.

Example 3

A compressed product including natural fiber was prepared and compared to a traditional compressed peat product. The traditional compressed peat product of 3 ft$^3$ weighted 55 lbs and expanded 2× to 6 ft$^3$ upon rehydration. 35 units of the compressed peat product units fit onto a traditional pallet having dimensions $d_1 \times d_2$. In comparison, the compressed product produced by the processes described herein was 37% lighter, weighted 35 lbs, was packed in 2.1 ft$^3$ which expanded 3.3 times to 7 ft$^3$. 40 units fit on the pallet having dimensions $d_1 \times d_2$. The herein-described product was thus lighter, expanded to a greater volume, and more units fit onto the pallet, making the product more economical and having a lower carbon footprint.

Example 4

Figure 4:
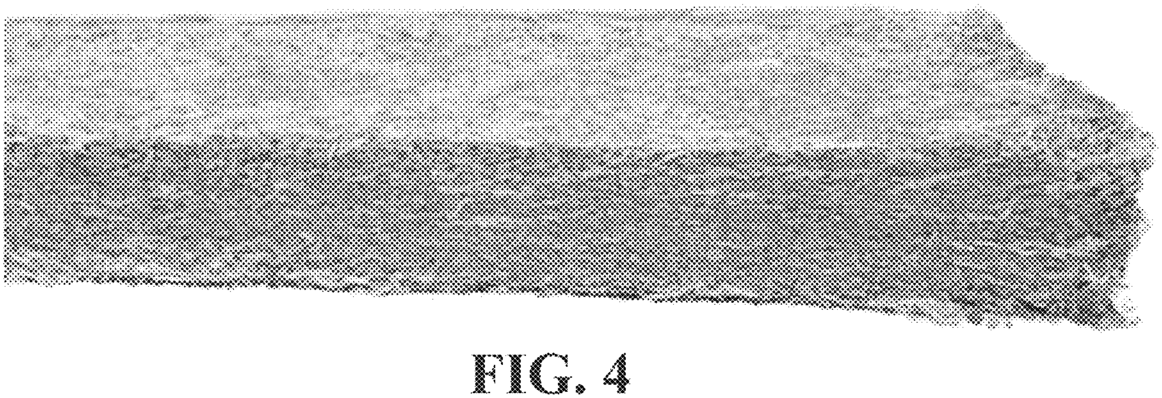
FIG. 4 is a photograph of an alternative compressed fiber product produced by the compression method described herein.

An alternative slab or plank of a fiber mixture compressed according to the compression process described herein is depicted in FIG. 4. The slab was prepared using wood and bark fiber and coir fiber.

Example 5

Figure 5:
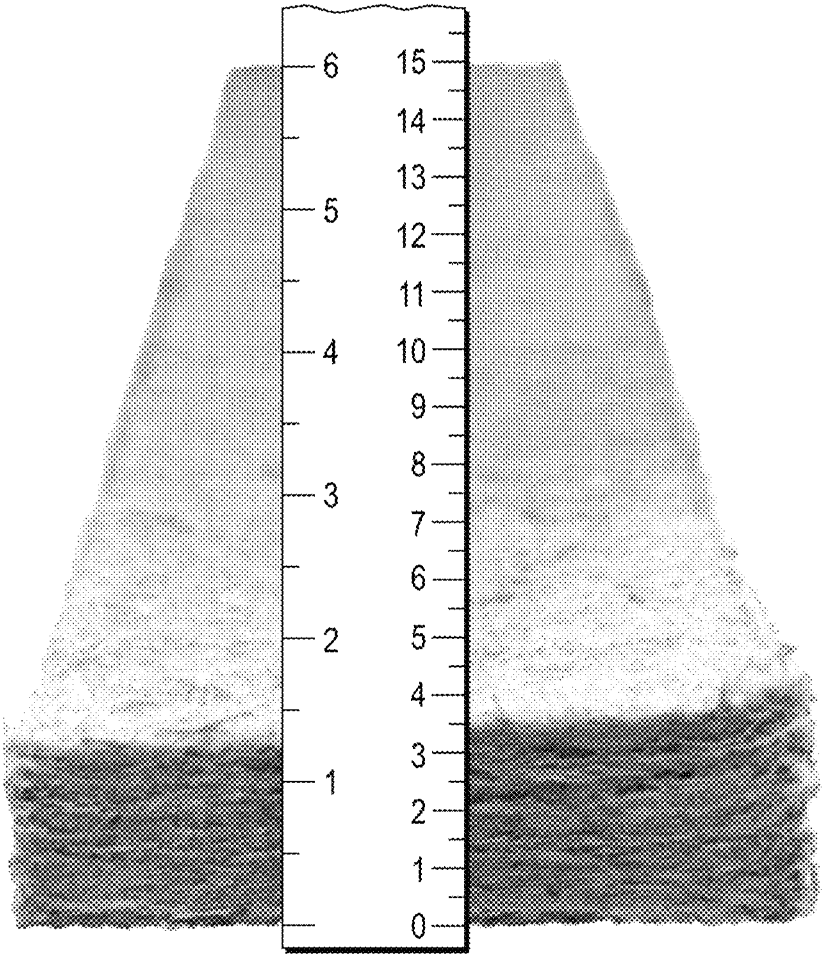
FIG. 5 is a photograph of a compressed slab of Example 5 two hours after the end of compression process.

A compressed slab was prepared by the following method. 2.5 lbs of loose fill fiber having density of 1.17 lbs/ft$^3$ (18.74 kg/m$^3$) and 18% moisture content was placed into a metal chamber having dimensions of 38"×5¼"20" (96.52 cm×12.95 cm×50.8 cm). A pressing member was placed on top of the loose fiber. The fiber was pressed for about 40 seconds at about 1500 PSI to obtain the length and width of the chamber and a height of 0.5 inches (1.27 cm). Immediately after compression, the slab's height increased to ⅞" (2.22 cm), and after 2 hours during which the slab remained outside of the container, the slab's height increased to about 1¼" (3.18 cm). The slab's length increased by ¾" (1.91 cm) and the slab's width increased by 7/20" (0.35 cm). No further increase of dimensions of the slab was observed after the 2-hour time period. The final compressed slab dimensions were 38¾"×5⅗"×1¼" (97.27 cm×13.30 cm×3.18 cm). FIG. 5 depicts the slab after the 2-hour period. As can be seen, the slab has substantially uniform shape and dimensions, the top portion has no bulging.

Figure 6:
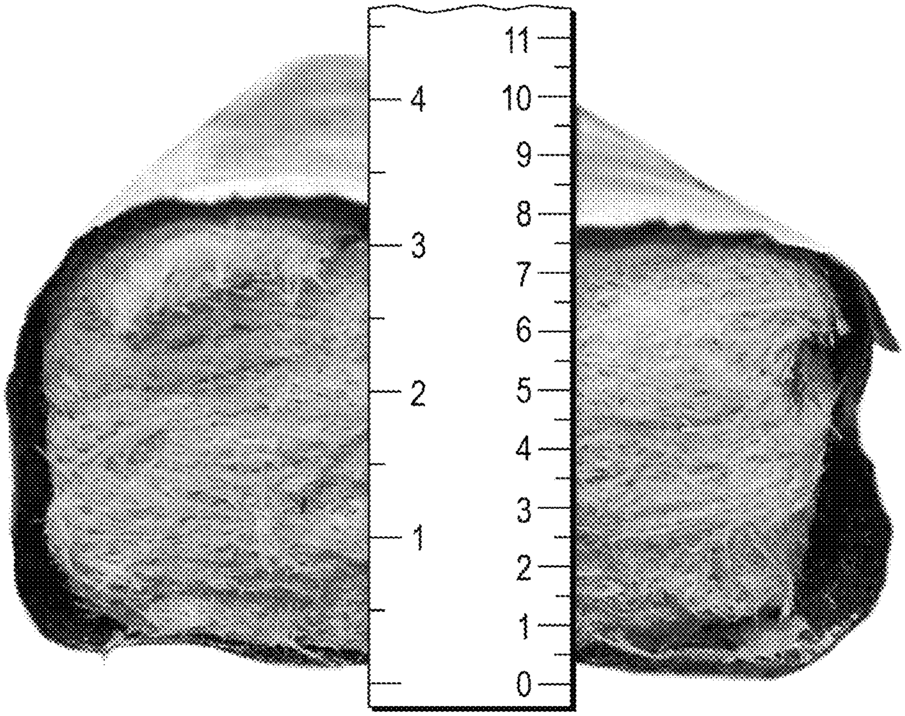
FIG. 6 shows a cross-sectional view of the slab of Example 5 after rehydration within a grow bag.
Figure 7:
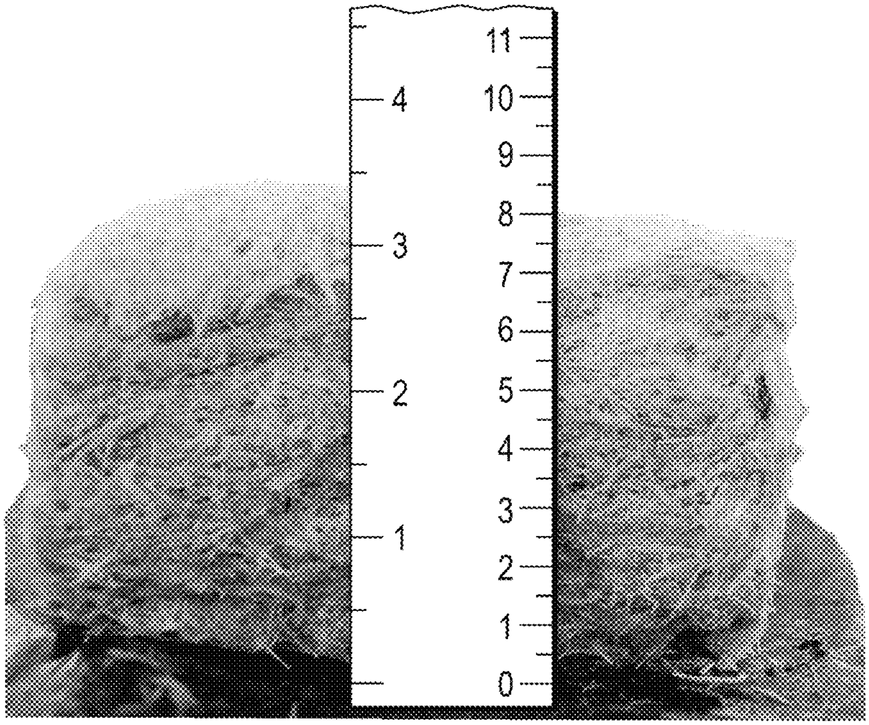
FIG. 7 shows a cross-sectional view of the rehydrated slab of Example 5 after the grow bag was removed from around the rehydrated slab.
Figure 8:
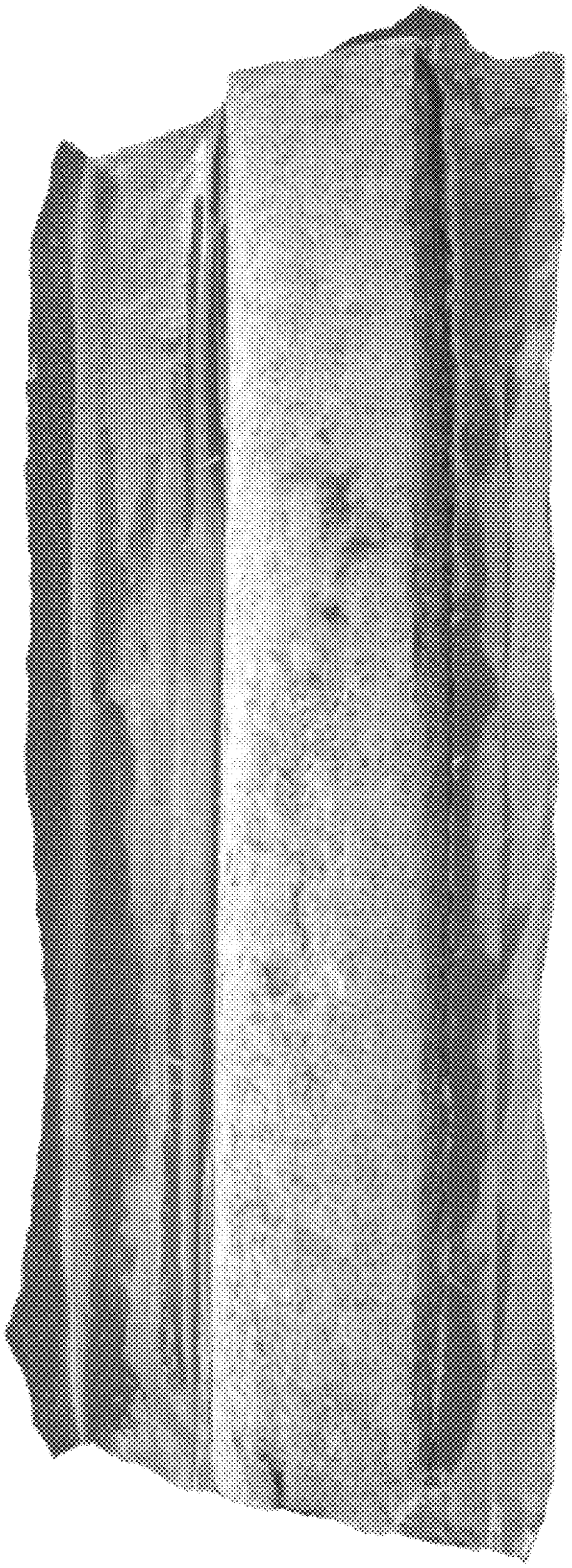
FIG. 8 shows a perspective top view of the rehydrated slab of Example 5 after the grow bag was removed.

The compressed slab of Example 5 was further inserted in a grow bag and rehydrated by applying about 3 gallons of water from a drip emitter along the length of the slab for 10 minutes to fully expand. The rehydrated slab expanded in all directions and filled the grow bag. A cross-section of the rehydrated slab within the grow bag sleeve is depicted in FIG. 6 and in FIG. 7 after the grow bag sleeve was cut and removed from around the slab. The entire length of the rehydrated slab after the grow bag sleeve was removed is shown in FIG. 8. As can be seen, the rehydrated slab expanded to the desired dimensions of the grow bag and kept its dimensions and shape, with no bulging on the surface, even after the grow bag was removed.

Examples 6-11

Table 1 below captures Examples 6-12 prepared by the compression process described herein.

TABLE 1

Physical properties of compressed slabs 6-11 after compression and rehydration

| Example No. | Composition at 20% moisture content | Compressed loose bulk density ρx [lbs/ft$^3$/ kg/m$^3$] | Compressed dimensions [inch/cm] | Rehydrated dimensions [inch/cm] | Rehydrated weight at full saturation [lbs/kg] |
|---|---|---|---|---|---|
| 6 | 100 wt. % wood components | 3.10/49.66 | 38 × 5.25 × 1.4 | 39.5 × 5.75 × 4/ 100.33 × 14.61 × 10.16 | 18.7/8.48 |
| 7 | 50 wt. % coir, 50 wt. % wood components | 3.80/60.87 | 96.52 × 13.34 × 3.56 | 39.5 × 5.75 × 4/ 100.33 × 14.61 × 10.16 | 27.1/12.29 |
| 8 | 50 wt. % cellulose, 50 wt. % wood components | 3.65/58.47 | | 39.5 × 5.75 × 3.5/ 100.33 × 14.61 × 8.89 | 26.49/ 12.02 |
| 9 | 100 wt. % wood components | 3.3/52.86 | 38 × 7.25 × 1.0 | 39.5 × 7.75 × 3/ 100.33 × 37.11 × 7.62 | — |
| 10 | 50 wt. % coir, 50 wt. % wood components | 4.0/64.07 | | 39.5 × 7.75 × 3/ 100.33 × 37.11 × 7.62 | — |
| 11 | 50 wt. % cellulose, 50 wt. % wood components | 3.9/62.47 | | 39.5 × 7.75 × 3/ 100.33 × 37.11 × 7.62 | — |

Examples 12-14

Figure 9:
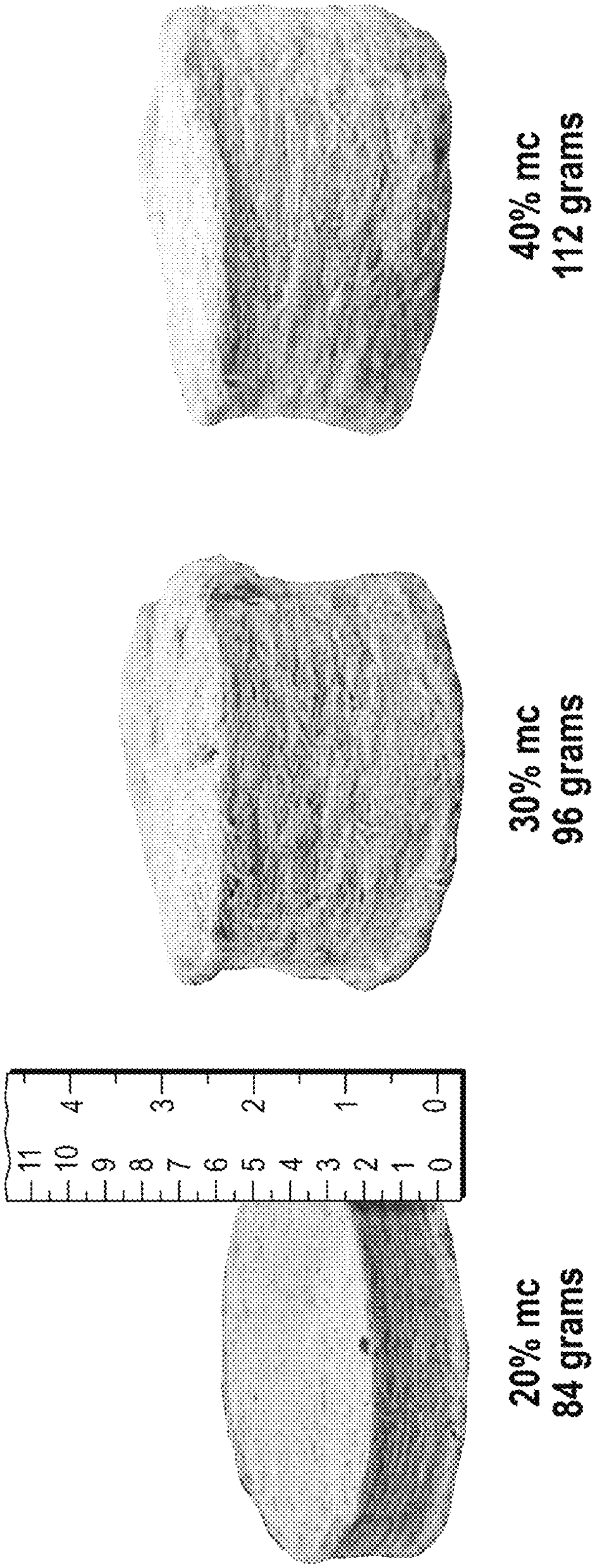
FIG. 9 shows a comparison of different levels of fiber slab rebound of Examples 12-14 having different initial moisture content.

Samples 12-14, each having 100 wt. % wood fiber composition, having different densities listed in Table 2 below were compressed under the same conditions—same pressure and hold time. FIG. 9 shows various degrees of rebound of Examples 12-14, indicating that initial moisture content may affect the degree of rebound.

TABLE 2

| Example No. | 12 | 13 | 14 |
|---|---|---|---|
| Initial moisture content [%] | 20 | 30 | 40 |

Table 3 below captures Examples 15-29 prepared by the compression process described herein.

TABLE 3

Physical properties of compressed slabs 15-29 after compression and rehydration.

| Composition | Ex | Compressed Dimension (L × W × H) (in) | Compressed Volume (cuft) | Hydrated Dimension (L × W × H) (in) | Volume (cuft) | Material Weight (lbs.) | % Moisture Content (for all Density Calculations) | Initial Density (lbs./ cuft) | Slab Density (lbs./ cuft) | Expanded Slab Density (lbs./ cuft) | Slab Compression Ratio (X:1) (from Initial Density) | Expanded Slab Compression Ratio (X:1) (from Initial Density) |
|---|---|---|---|---|---|---|---|---|---|---|---|---|
| 100 wt. % wood components | 15 | 38 5.25 1.2 | 0.139 | 39.5 5.9 3 | 0.405 | 2.5 | 17 | 1.15 | 18.05 | 6.179 | 15.69 | 5.37 |

TABLE 3-continued

Physical properties of compressed slabs 15-29 after compression and rehydration.

| Composition | Ex | Compressed Dimension (L × W × H) (in) | | | Compressed Volume (cuft) | Hydrated Dimension (L × W × H) (in) | | | Volume (cuft) | Material Weight (lbs.) | % Moisture Content (for all Density Calculations) | Initial Density (lbs./cuft) | Slab Density (lbs./cuft) | Expanded Slab Density (lbs./cuft) | Slab Compression Ratio (X:1) (from Initial Density) | Expanded Slab Compression Ratio (X:1) (from Initial Density) |
|---|---|---|---|---|---|---|---|---|---|---|---|---|---|---|---|---|
| 100 wt. % wood components | 16 | 38 | 5.25 | 0.5 | 0.058 | | | | | 2.5 | 17 | 1.15 | 43.31 | | 37.66 | |
| 100 wt. % wood components | 17 | 38 | 5.25 | 1.25 | 0.144 | 39.5 | 5.9 | 3 | 0.405 | 2.75 | 20 | 1.3 | 19.06 | 6.797 | 14.66 | 5.23 |
| 100 wt. % wood components | 18 | 38 | 5.25 | 1.5 | 0.173 | 39.5 | 5.9 | 3.94 | 0.531 | 3.2 | 17 | 1.15 | 18.48 | 6.022 | 16.07 | 5.24 |
| 100 wt. % wood components | 19 | 38 | 5.25 | 1.5 | 0.173 | 39.5 | 5.9 | 3.94 | 0.531 | 3.1 | 17 | 1.21 | 17.90 | 5.834 | 14.79 | 4.82 |
| 50 wt. % coir, 50 wt. % wood components | 20 | 38 | 5.25 | 1.5 | 0.173 | 39.5 | 5.9 | 3.94 | 0.531 | 3.8 | 17 | 5.55 | 21.94 | 7.151 | 3.95 | 1.29 |
| 20 wt. % coir, 80 wt. % wood components | 21 | 38 | 5.25 | 1.5 | 0.173 | 39.5 | 5.9 | 3.94 | 0.531 | 3.65 | 17 | 3.42 | 21.08 | 6.869 | 6.16 | 2.01 |
| 50 wt. % cellulose, 50 wt. % wood components | 22 | 38 | 5.25 | 1.5 | 0.173 | 39.5 | 5.9 | 3.94 | 0.531 | 3.65 | 13 | 2.02 | 21.08 | 6.869 | 10.43 | 3.40 |
| 20 wt. % cellulose, 80 wt. % wood components | 23 | 38 | 5.25 | 1.5 | 0.173 | 39.5 | 5.9 | 3.94 | 0.531 | 3.4 | 13 | 2 | 19.63 | 6.398 | 9.82 | 3.20 |
| 100 wt. % coir | 24 | 38 | 5.25 | 1.25 | 0.144 | 39.5 | 5.9 | 3.94 | 0.531 | 4.65 | 14 | 9 | 32.22 | 8.751 | 3.58 | 0.97 |
| 100 wt. % wood components | 25 | 38 | 7.25 | 1.2 | 0.191 | 39.5 | 7.87 | 3 | 0.540 | 3.25 | 17 | 1.21 | 16.99 | 6.022 | 14.04 | 4.98 |
| 50 wt. % coir, 50 wt. % wood components | 26 | 38 | 7.25 | 1.2 | 0.191 | 39.5 | 7.87 | 3 | 0.540 | 4 | 17 | 5.55 | 20.91 | 7.412 | 3.77 | 1.34 |
| 20 wt. % coir, 80 wt. % wood components | 27 | 38 | 7.25 | 1.2 | 0.191 | 39.5 | 7.87 | 3 | 0.540 | 3.8 | 17 | 3.42 | 19.86 | 7.041 | 5.81 | 2.06 |
| 50 wt. % cellulose, 50 wt. % wood components | 28 | 38 | 7.25 | 1.2 | 0.191 | 39.5 | 7.87 | 3 | 0.540 | 3.9 | 13 | 2.02 | 20.38 | 7.226 | 10.09 | 3.58 |
| 20 wt. % cellulose, 80 wt. % wood components | 29 | 38 | 7.25 | 1.2 | 0.191 | 39.5 | 7.87 | 3 | 0.540 | 3.65 | 13 | 2 | 19.08 | 6.763 | 9.54 | 3.38 |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A compressed horticultural slab comprising:

a horticultural substrate including a plurality of fibers compressed in a volume ratio of initial to compressed fiber of 1:4 to 1:60, the plurality of fibers having a shape of the slab, a first volume when the substrate has a moisture content of up to about 25 wt. % and a second volume when the moisture content increases above about 25 wt. %, based on the total weight of the substrate, the second volume being at least 3 times greater than the first volume, the slab having a higher volume of capillary pores than non-capillary pores in the compressed fibers than in the initial fibers, the plurality of fibers including 100 wt. % wood fiber or coco coir and wood fiber in a ratio of 40:60 to 60:40.

2. The slab of claim 1, wherein the substrate includes 100% refined wood fiber.

3. The slab of claim 1, further comprising fertilizer(s), macronutrient(s), micronutrient(s), mineral(s), binder(s), natural gum(s), surfactant(s), compost, paper, sawdust, or a combination thereof.

4. The slab of claim 1, wherein the slab is sterile and the plurality of fibers have a uniform density throughout the slab before and after rehydration.

5. The slab of claim 1, wherein the slab's surface is free of bulging when the slab has a first set of dimensions or a second set of dimensions.

6. The slab of claim 1, wherein the slab is flexible and breakage-resistant.

7. The slab of claim 5, wherein the second set of dimensions is about 1.25 to 5% greater than the first set of dimensions.

8. A compressed horticultural slab comprising:

a horticultural fibrous substrate comprising a plurality of compressed fibers including wood, coir, or a combination thereof, the substrate having a moisture content of up to about 20 to 25 wt. % and having a final loose bulk density defined by a formula (I):

$$\rho x = \rho 1 * x, \tag{I}$$

where:

$\rho x$ is the final loose bulk density, $\rho 1$ is the initial loose bulk density, and x is the compression factor including any number between 4 and 60, wherein the compressed slab has a substantially rectangular shape and uniform dimensions throughout its length and a higher volume of capillary pores than non-capillary pores.

9. The slab of claim 8, wherein $\rho 1 = 1.35$ lbs/ft$^3$.

10. The slab of claim 8, wherein x is 12 to 50.

11. The slab of claim 8, wherein the plurality of compressed fibers includes coco coir and wood fiber in a ratio of 20:80 to 50:50.

12. The slab of claim 8, wherein the substrate includes 100% refined wood fiber.

13. A method of forming the compressed horticultural slab of claim 1, the method comprising:

filling a container with the fiber substrate having a plurality of loose metered fibers having initial loose bulk density $\rho 1$;

pressing the fibers in the container for a dwell time under such pressure that a compression ratio of the initial to compressed fiber of 1:3 to 1:60 and final loose bulk density $\rho x$ is achieved, wherein $\rho x > \rho 1$, while the fibers obtain the shape and at least some dimensions of the container such that the slab is formed; and removing the slab from the container.

14. The method of claim 13, wherein the pressing is provided in more than one stage.

15. The method of claim 13, wherein the dwell time has the same value in each stage.

16. The method of claim 13, wherein the pressing is provided in a temperature range of 60 to 500 F (15.5 to 260° C.).

17. The method of claim 13, wherein the container has a predetermined fill line and the filling includes filling the container with the fibers evenly below the fill line and unevenly above the fill line.

18. The method of claim 13, wherein the filling includes applying a lesser amount of fibers to a container's central portion than the amount of fibers provided around a perimeter of the container.

19. The method of claim 13, wherein the pressing includes decreasing a volume of non-capillary pores in the fiber substrate by compressing the substrate to the desired final loose bulk density $\rho x$.

20. A compressed slab comprising:

a growing medium substrate including a plurality of fibers compressed in a volume ratio of initial to compressed fiber of 1:3 to 1:60, the plurality of fibers having a shape of the slab, a first volume when the substrate has a moisture content of up to about 25 wt. % and a second volume when the moisture content increases above about 25 wt. %, based on the total weight of the substrate, the second volume being at least 4 times greater than the first volume, the plurality of fibers comprising wood, coir, or a combination thereof, the slab having a higher ratio of capillary pores to non-capillary pores in the compressed fibers than in the initial fibers.

21. The compressed horticultural slab of claim 1, wherein upon rehydration, the slab expands in thickness by 150-500% and achieves a rehydrated loose bulk density of 4-15 lb/ft$^3$.

22. The compressed horticultural slab of claim 1, wherein a slab surface remains substantially free of bulging.

23. The slab of claim 20, wherein the plurality of compressed fibers includes coco coir and wood fiber in a ratio of 20:80 to 50:50.

* * * * *